United States Patent
Shiina et al.

(10) Patent No.: US 6,713,932 B2
(45) Date of Patent: Mar. 30, 2004

(54) EXTERNAL CONNECTING STRUCTURE OF ELECTRIC MOTOR

(75) Inventors: Hiroyuki Shiina, Kiryu (JP); Tamotsu Miyamoto, Ashikaga (JP); Kazuhiro Kawada, Sano (JP); Toshikazu Terada, Ohta (JP)

(73) Assignee: Mitsuba Corporation, Kiryu (JP)

( * ) Notice: Subject to any disclaimer, the term of this patent is extended or adjusted under 35 U.S.C. 154(b) by 100 days.

(21) Appl. No.: 10/079,430

(22) Filed: Feb. 22, 2002

(65) Prior Publication Data

US 2002/0117915 A1 Aug. 29, 2002

(30) Foreign Application Priority Data

Feb. 28, 2001 (JP) ........................................ 2001-054980

(51) Int. Cl.[7] ........................ H02K 13/00; H02K 39/42
(52) U.S. Cl. ...................... 310/239; 310/239; 310/240
(58) Field of Search ................................. 310/239, 240

(56) References Cited

U.S. PATENT DOCUMENTS

| | | | | | |
|---|---|---|---|---|---|
| 4,311,936 A | * | 1/1982 | Ozaki et al. | ................. | 310/242 |
| 5,216,305 A | * | 6/1993 | Strobl | ........................... | 310/71 |
| 5,252,878 A | * | 10/1993 | Spellman | ...................... | 310/42 |
| 5,942,822 A | * | 8/1999 | Iwata | ........................... | 310/71 |
| 6,150,744 A | * | 11/2000 | Onishi | ........................... | 310/89 |
| 6,160,329 A | * | 12/2000 | Ng | ................................ | 310/40 |
| 6,246,145 B1 | * | 6/2001 | Morimoto | ................... | 310/245 |
| 6,465,920 B2 | * | 10/2002 | Harita | ........................... | 310/71 |

FOREIGN PATENT DOCUMENTS

JP U-62-179392 11/1987

* cited by examiner

Primary Examiner—Nestor Ramirez
Assistant Examiner—Iraj A. Mohandesi
(74) Attorney, Agent, or Firm—Oliff & Berridge, PLC (57) ABSTRACT

An external connection structure for an electric motor in which basic members are able to be commonly used in an electric fan motor for which either a lead wire or a direct coupler are prepared as an external connection member. Tip end portions of first and third conductor plates and the tip ends of the second and fourth conductor plates are caused to extend between respective brushes which are adjacent to each other in the circumferential direction of the holder stay, and the tip end portions can be made visible through through-holes provided at the body portion of the end cover.

9 Claims, 11 Drawing Sheets

EXTERNAL CONNECTING STRUCTURE OF ELECTRIC MOTOR

BACKGROUND OF THE INVENTION

1. Field of Invention

The invention relates to a technical field of an external connection structure of an electric motor that is incorporated in vehicles, etc.

2. Description of Related Art

Generally, in electric motors of this type, there are some motors in which a holder stay, to hold brushes slidably in contact with a commutator of an armature shaft, is provided on an end cover that covers one end of a cylindrical yoke. An example of such an electric motor is a fan motor.

In such electric motors, in order to supply an external power source to the brushes, conductive plates that are conductive to the respective brushes extend onto the holder stay, formed of an insulating material, and external connection members are connected to the conductive plates. There are two available types for the external connection structure, one of which is of a lead-wire specification, and the other of which is of a direct coupler specification that is attached to an end cover and integral therewith. Generally, these two types are separately used, corresponding to an object or location in which the fan motor is mounted, and the place where it is installed. In this case, common uses of components become a theme in view of decreasing costs and simplifying production. For example, as shown in FIGS. 11(A) and 11(B), a lead wire 36 or a coupler 37 is connected through a notched portion formed on the outer periphery of the holder stay 35, whereby it is considered that the holder stay 35 can be commonly used.

Figure 11A:
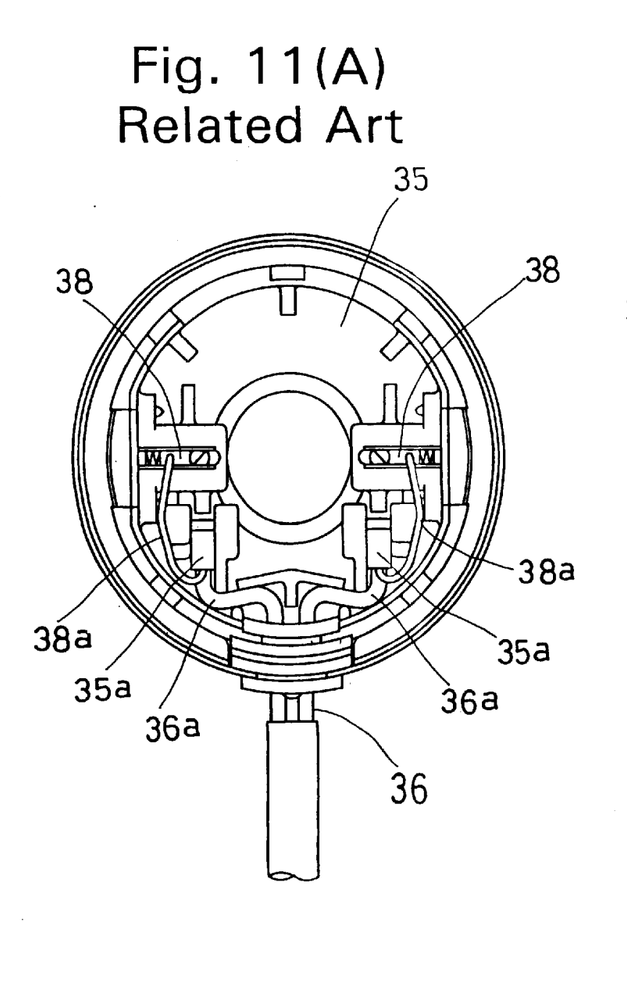
FIGS. 11(A) and 11(B) are front elevational views showing the end cover portion in prior art examples.
Figure 11B:
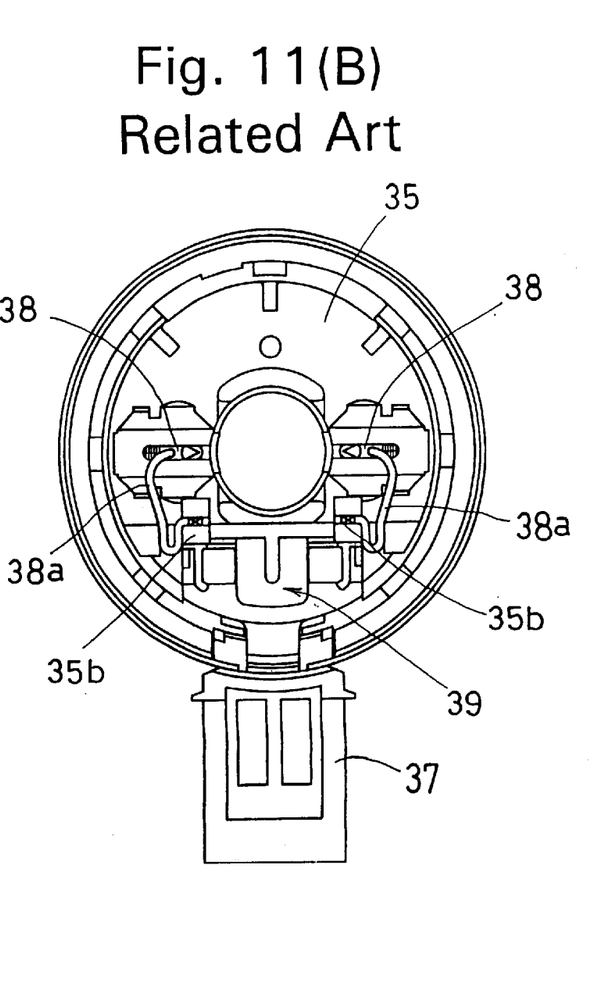

However, a type in which a fan motor is formed with a lead-wire is, as shown in FIG. 11(A), structured so that end portions of pig tails 38a led out from the respective brushes 38 are connected to the respective connection portions 35a provided at the holder stay 35, and the corresponding end portions 36a of the lead wire 36 dragged into the holder stay 35, as an external connection member, are connected to the respective connection portions 35a. To the contrary, a type in which the fan motor is formed with a direct coupler is, as shown in FIG. 11(B), structured so that respective end portions of pig tails 38a led out from the respective brushes 38 are connected to connection portions 35b that are provided at the holder stay 35 and are differently shaped from a connection portion 35a for the above-described lead wire, an intermediate connector 39 is connected to the respective connection portions 35b, and a coupler 37 fitted into the outer surface of the holder stay 35 is connected to the corresponding intermediate connector 39. Therefore, with regard to the lead-wire type fan motor and direct coupler type fan motor, separate members are required for peripheral components of the brushes 38, that is, between the pig tails 38a and external connection members 36, 37, wherein it becomes cumbersome or troublesome to manage products, and production costs are accordingly increased. An object of the invention resides in these points.

SUMMARY OF THE INVENTION

In view of these and other problems, the invention was developed. It is therefore an object of the invention to provide an external connection structure of an electric motor structured so as to be provided with a holder stay, which holds at least a pair of brushes slidably in contact with a commutator of an armature shaft, at an end cover that covers one end of a cylindrical yoke, wherein when providing a connection receiving portion that is made conductive to the brushes and is connected to an external connection member to secure an external power source, the connection receiving portion is located between the brushes adjacent to each other in the circumferential direction, and is composed of a conductive plate that can be visually observed via a through-hole opened at the end cover, and the visually observable portion of the conductive plate has a fitting portion, into which an external connection member to be inserted through the through-hole in the axial direction is fitted, formed thereon.

With such a structure, either of a lead wire or a direct coupler can be connected to an electric motor wherein common use of the components can be achieved.

In such a type, the fitting portion according to the invention may have a ring hole, which is oriented in the axial direction, formed thereon, and the circumferential portions thereof are formed of a pair of ring-shaped portions that are resiliently deformed so as to be brought into contact with each other and to be separated from each other.

Also, in such a type, the fitting portion according to the invention may be formed to be U-shaped, in which a recess portion that can be inserted in the axial direction is formed.

Further, in such a type, in the connection receiving portion according to the invention, an external lead-out coupler may be connected thereto and incorporated therein, a projection portion that may be inserted into the through-hole is formed on the lead-out coupler, and a projection end portion of a terminal built in the projection portion may be connected to the fitting portion.

Still further, in such a type, lead wires may be connected to the connection receiving portion according to the invention, the lead wires may be inserted into the through-hole via a grommet inserted in the through-hole, and the insertion tip end portion may be pressure-fitted to the fitting portion.

BRIEF DESCRIPTION OF THE DRAWINGS

The invention will be described with reference to the drawings, in which:

FIGS. 2(A)–2(C) show a holder stay, where

FIGS. 6(A)–6(C) show a direct coupler, where

FIGS. 9(A)–9(C) show a holder stay portion in which the fitting portion in the second embodiment is formed to be U-shaped, where

DETAILED DESCRIPTION OF PREFERRED EMBODIMENTS

Next, a description is given of embodiments of the invention with reference to the accompanying drawings based on FIGS. 1 through 8.

Figure 1:
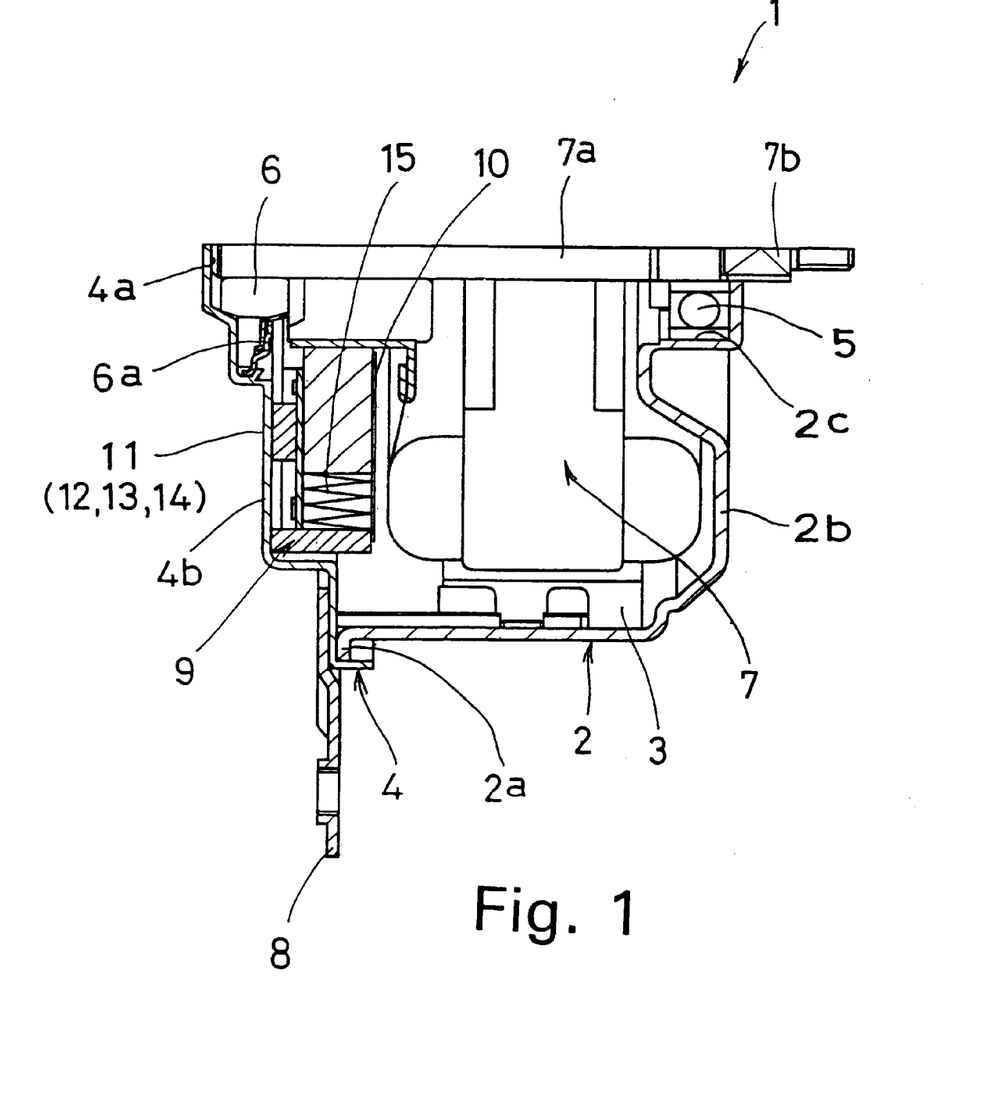
FIG. 1 is a partially sectional side view of the motor portion of a fan motor.

In the drawings, 1 denotes the motor portion of a fan motor incorporated in a vehicle. A yoke 2 that constitutes the corresponding motor portion 1 is structured so that it has a permanent magnet 3 fixed on the inner periphery of its cylindrical body having a bottom, and its open end 2a is covered by an end cover 4. The tip end portion and the base end portion of a rotor shaft (armature shaft) 7a that constitutes a rotor (armature) 7 are, respectively, rotatably supported on a bearing portion 2c formed on the bottom 2b of the yoke 2 and on a recess-grooved bearing portion 4a formed on the end cover 4 via bearings 5 and 6, wherein fins (not illustrated) that constitute the fan motor are mounted, so as to be rotatable but so as not to slip off. The fins are mounted on the protrusion tip end portion 7b of the rotor shaft protruding from the yoke bottom 2b. The basic structure of these components is the same as usual. Hereinafter the side of the tip end portion of the rotor shaft 7a is referred to "the tip end side" and the base end portion thereof is referred to "the base end side".

A supporting member 8 is provided at three positions in the circumferential direction of the outer periphery of the end cover 4 in order to fix the motor portion 1 on the vehicle body side.

The above-described end cover 4 is made of a metallic material and is disk-shaped. The above-described bearing portion 4a is recessed toward the base end side at the center side of the end cover 4 to form a stepped recessed-grooved portion. The bearing 6, as well as a urging member 6a that urges the bearing 6 to the base end side, is disposed in the bearing portion 4a. At the outer diameter side of the bearing portion 4a, is formed an end cover body portion 4b. A holder stay 9 composed of an insulating material is provided integrally inside of the end cover body portion 4b.

A through-hole 9a is formed at the holder stay 9 on the inner diameter side thereof, and the base end side of the above-described rotor shaft 7a is inserted into the through-hole 9a so as to pass therethrough. Further, at a face 9b of the holder stay 9 on the tip end side (hereinafter referred to "the tip end side face 9b"), four brush holders 10, formed of conductive material, are provided in the circumferential direction, wherein two pairs of the first and second brushes 11, 12, 13, 14 are internally attached to the brush holders 10. The first and second brushes 11, 12, 13, 14 are disposed so that the brushes (the first and second brushes 11, 13 of the positive pole, and the first and second brushes 12, 14 of the negative pole) of the same polarity are opposed to each other in the diameter direction. At this time, spring members 15 are located at the outer diameter side of the first and second brushes 11, 12, 13, 14 and are provided in the brush holder 10 while the first and second brushes 11, 12, 13, 14 are caused to slide so as to be sinkable in the inner radial direction with respect to the brush holders 10, whereby the first and second brushes 11, 12, 13, 14 are urged toward the inner radial direction, and the edge surface of each pair of the first and second brushes 11, 12, 13, 14 are set so as to be resiliently brought into sliding contact with a commutator 16 fixed on the outer circumference of the rotor shaft 7a passing through the through-hole 9a of the holder stay.

Figure 2A:
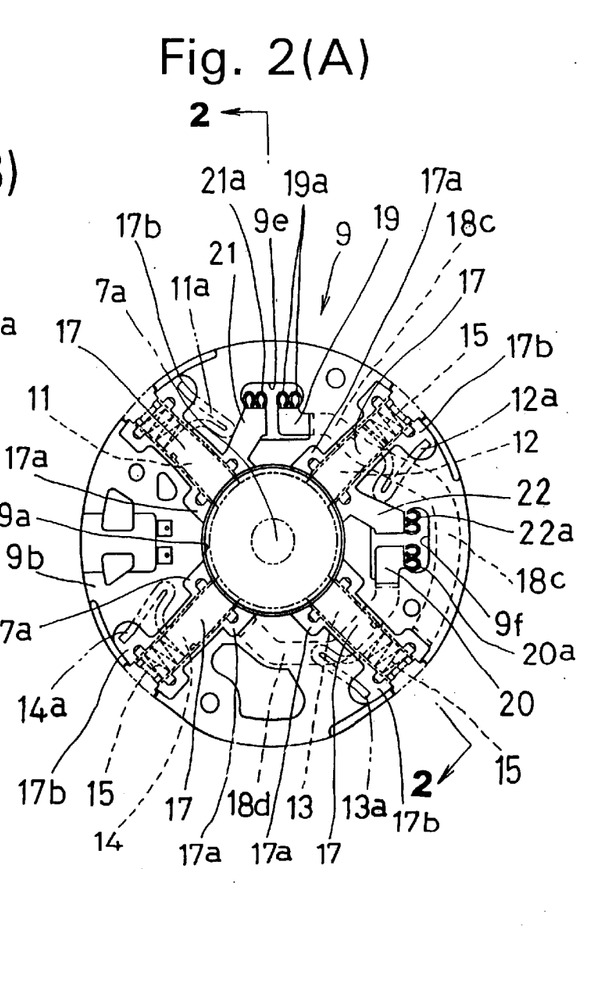
FIG. 2(A) is a front elevational view thereof.
Figures 2B, 2C:
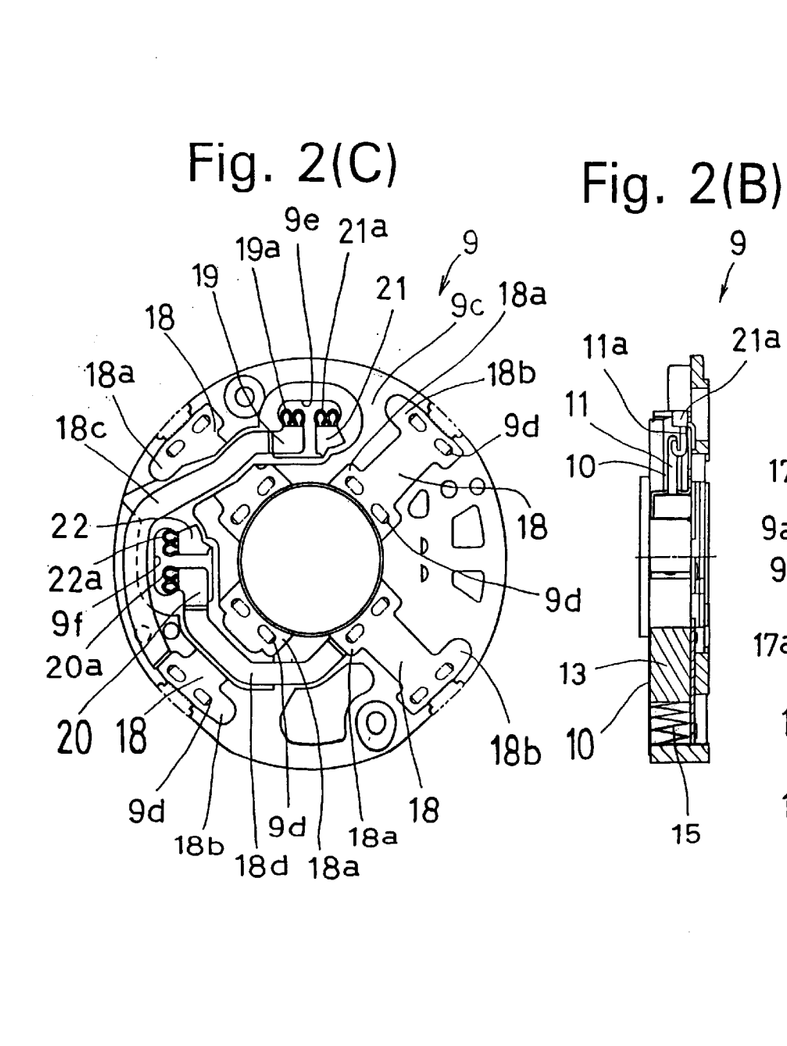
FIG. 2(B) is a cross-sectional view taken along the line 2—2 in FIG. 2(A)
FIG. 2(C) is a backside view.

Inside and outside conductors 17, 18, which are positioned at the attaching portions of the respective brush holders 10 and at the position opposing the outer circumference thereof, are formed of conductive material and are fixed at the tip end side face 9b of the holder stay 9 and a face 9c thereof on the base end side (hereinafter referred to "the base end side face 9c") integrally therewith. The brush holders 10, whose cross-sections are channel-shaped, are fixed at the fixing portions of the inside and outside conductors 17, 18. The brush holders 10 are supported on the holder stay 9 with the following structure; namely, at the fixing portions of the inside and outside conductors 17, 18, attaching protrusion pieces of the brush holders 10, which are formed at leg pieces opposed to each other on inner or outer diameter side, are inserted into and engaged with attaching holes 9d formed so that the attaching holes 9d can pass through the inner and outer surfaces 9b, 9c (namely, the tip end side face 9b and the base end side face 9c) of the holder stay 9, along with the inside and outside conductors 17, 18. By folding the insertion end portion thereof at the base end side face 9c of the holder stay 9, the holder brushes 10 are supported on the holder stay 9, whereby the respective brush holders 10 are electrically connected (made conductive) to the inside and outside conductors 17, 18 that are disposed at the attaching portions of the brush holders 10. Still further, the outside conductor 18, which is fixed on the outer surface 9c of the holder stay 9 and is positioned at the portions corresponding to the negative pole first brush 12 and the positive pole second brush 13, is dividedly formed so that the outside surface (insulating material) of the holder stay 9 is exposed to the intermediate portion in the diameter direction.

Inner protrusion pieces 17a, 18a are formed at both ends in the circumferential direction of the inner diameter side end portion of the above-described inside and outside conductors 17, 18, and outer protrusion pieces 17b, 18b are formed at both ends in the circumferential direction of the outer diameter side end portion thereof. On the other hand, base end portions of pig tails 11a, 12a, 13a, 14a are connected to the respective first and second brushes 11, 12, 13, 14, and the tip end portions of the pig tails 11a, 12a, 13a, 14a are, respectively, connected to the outside protrusion piece 17b of the inside conductor 17 corresponding thereto, whereby the inside and outside conductors 17, 18, and the entire brush holders 10 corresponding thereto are electrically connected (made conductive) to the brushes 11, 12, 13, 14 that are internally attached to the corresponding brush holders 10.

Still further, first and second window holes 9e, 9f are formed between the brushes 11, 12, 13, 14 adjacent to each other in the circumferential direction of the holder stay 9, that is, between the positive pole first brush 11 and the negative pole first brush 12, and between the negative pole first brush 12 and the positive pole second brush 13. And, the base end portions of first and second conductor plates 19, 20 are embedded at the circumferential edge of the respective window holes 9e, 9f so that the tip end portions 19a of the first conductor plate 19 are seen from one half portion of an opening portion of the first window hole 9e and the tip end portions 20a of the second conductor plate 20 are seen from one half portion of an opening portion of the second window hole 9f.

The third conductor plate 21 is integrally formed from the inside protrusion piece 17a of the inside conductor 17 at the portion corresponding to the positive pole first brush 11 toward the other half portion of the first window hole 9e, and the tip end portion 21a of the third conductor plate 21 and the tip end portion 19a of the first conductor plate 19 are set so as to be seen adjacent to each other with appointed spacing secured therebetween at the opening portion of the first window hole 9e.

An extension conductor plate 18c that extends from the outside protrusion piece 18b of the outside conductor 18 at the portion corresponding to the positive pole second brush 13 is connected to the first conductor plate 19, wherein the tip end portions 19a, 21a of the third and the first conductor plates 21, 19 that are conductive with the positive pole first and second brushes 11, 13 are set so as to be disposed in the first window hole 9e as a connection receiving portion (the first connection receiving portion A) of the invention.

On the other hand, the fourth conductor plate 22 is integrally formed from the inside protrusion piece 17a of the inside conductor at the portion corresponding to the negative pole first brush 12 toward the second window hole 9f side, and the tip end portion 22a of the fourth conductor plate 22 and the tip end portion 20a of the second conductor plate 20 are set so as to be seen adjacent to each other with appointed spacing secured therebetween at the opening portion of the second window hole 9f. An extension conductor plate 18d that extends from the inside protrusion piece 18a of the outside conductor 18 at the portion corresponding to the negative pole second brush 14 is connected to the second conductor plate 20, whereby the tip end portions 22a, 20a of the fourth and the second conductor plates 22, 20 that are made conductive with the negative pole first and second brushes 12, 14 are set so as to be disposed at the second window hole 9f as a connection receiving portion (the second connection receiving portion B) of the invention. In this connection, the extension conductor plates 18c, 18d are disposed in such a state where the plates are insulated from the other outside conductor 18, along the base end side 9c of the holder stay 9.

Figure 3:
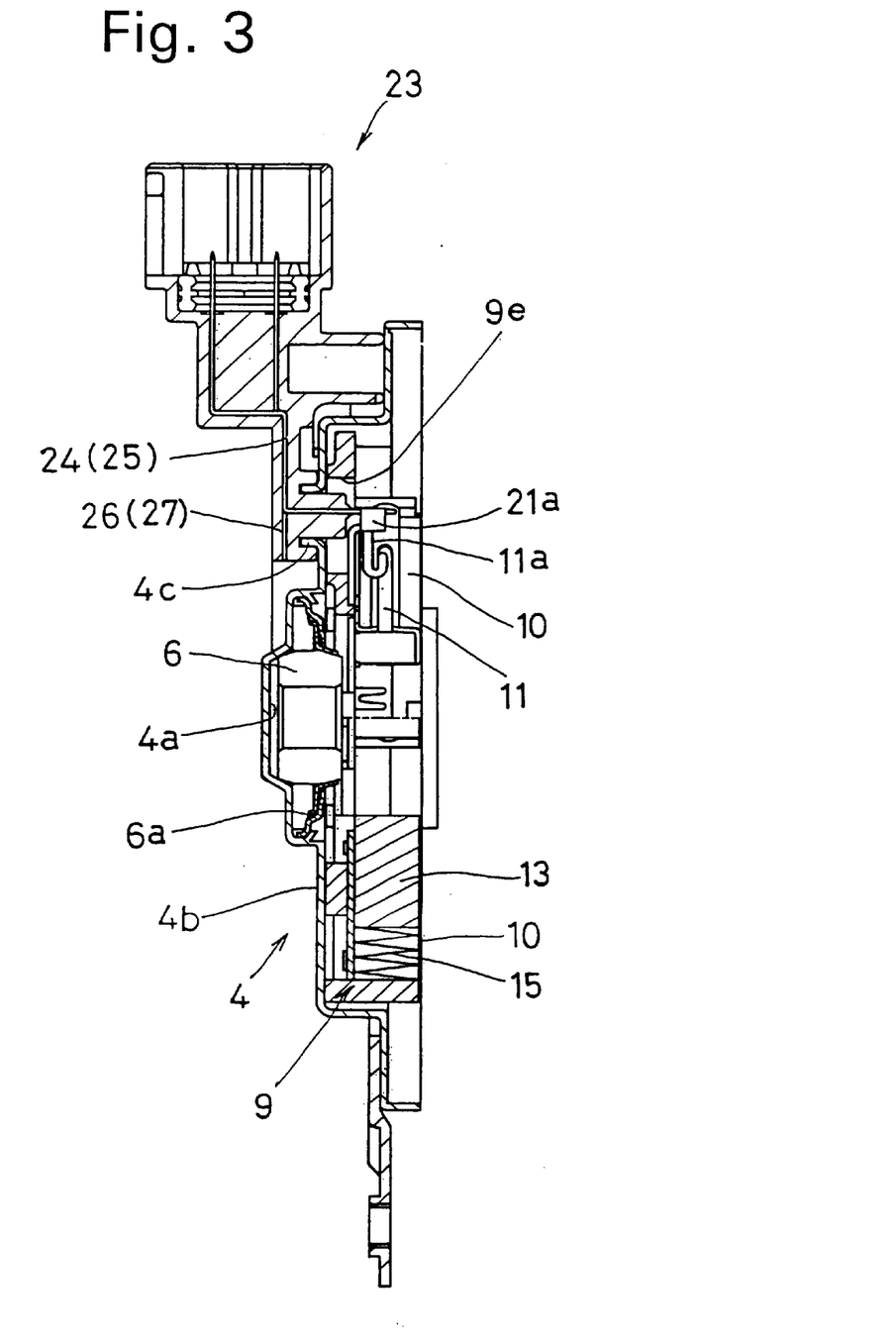
FIG. 3 is a sectional side view of the end cover portion.
Figure 4:
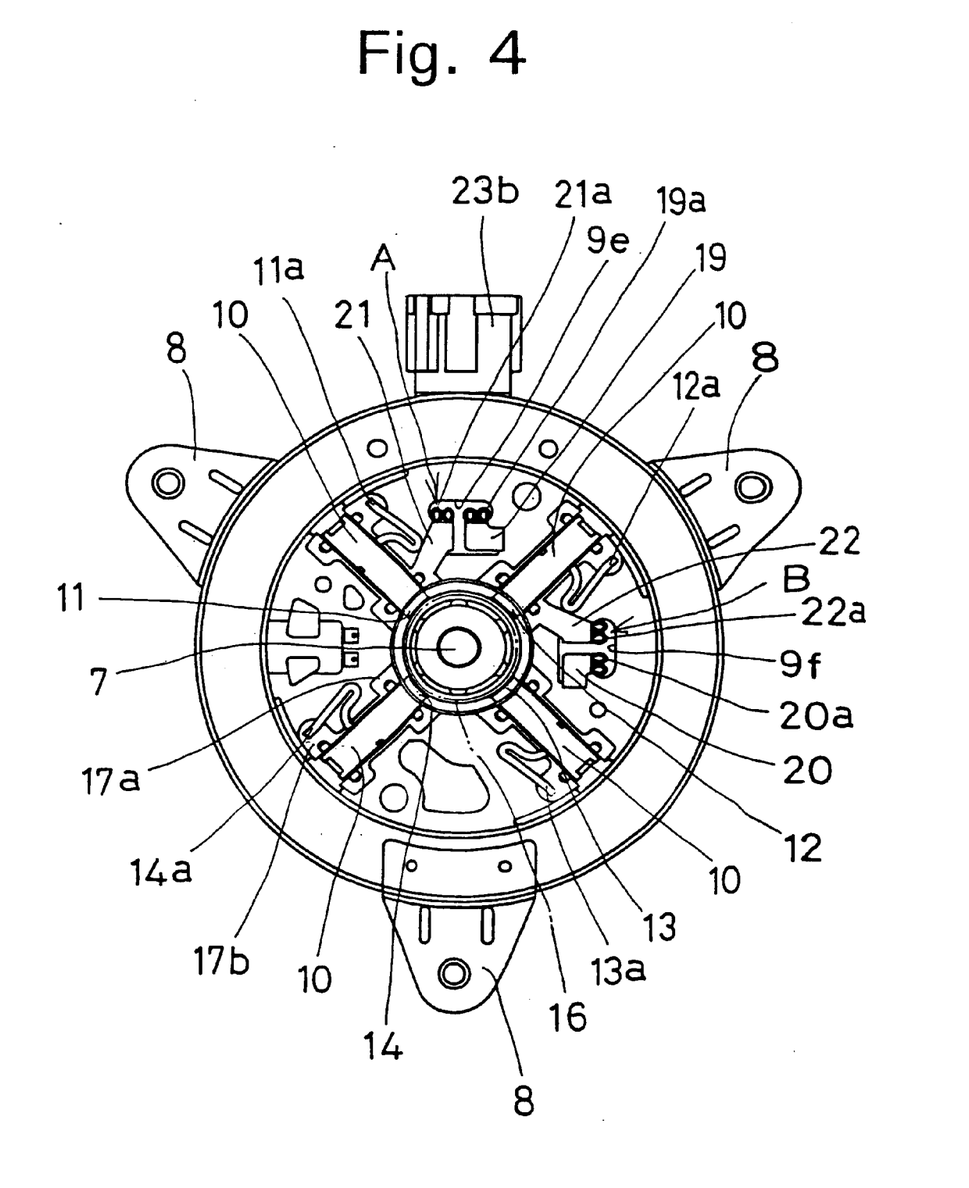
FIG. 4 is a front elevational view of the end cover portion.
Figure 5:
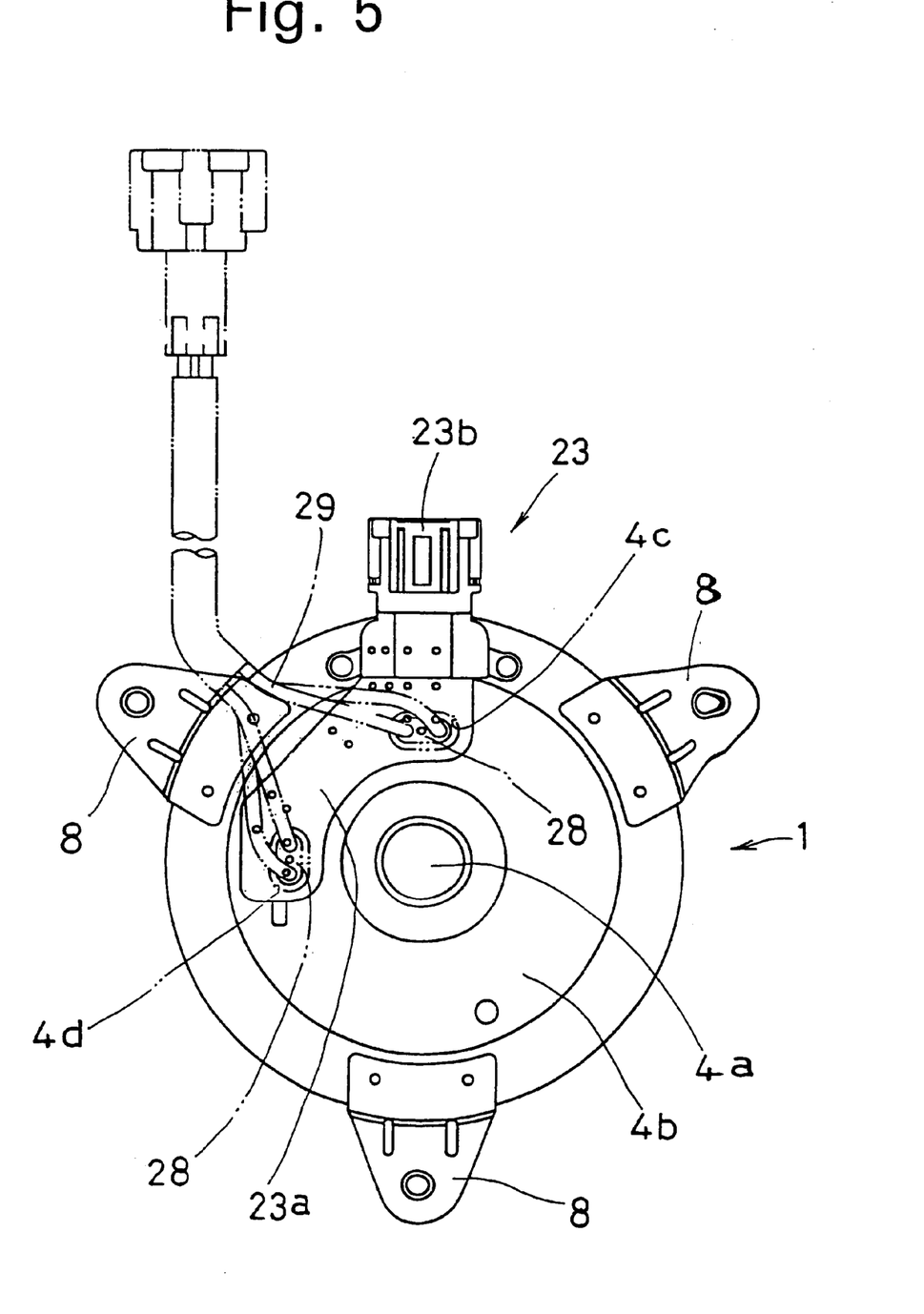
FIG. 5 is a backside view of the end cover portion.
Figure 6A:
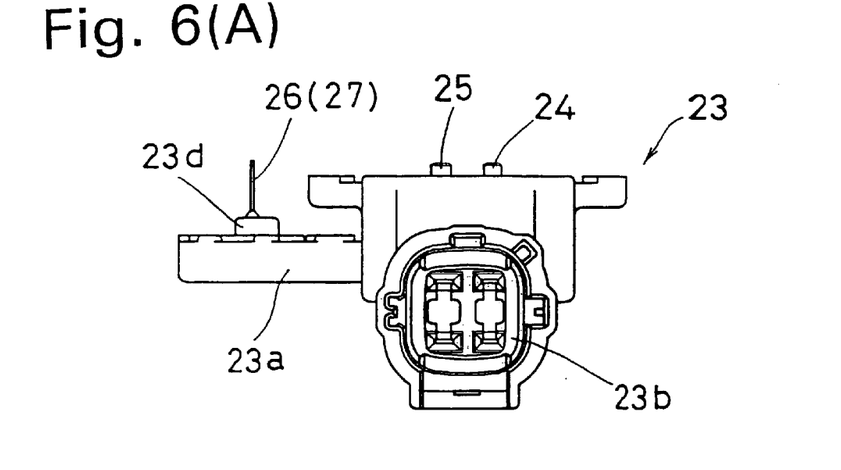
FIG. 6(A) is a plan view.
Figure 6B:
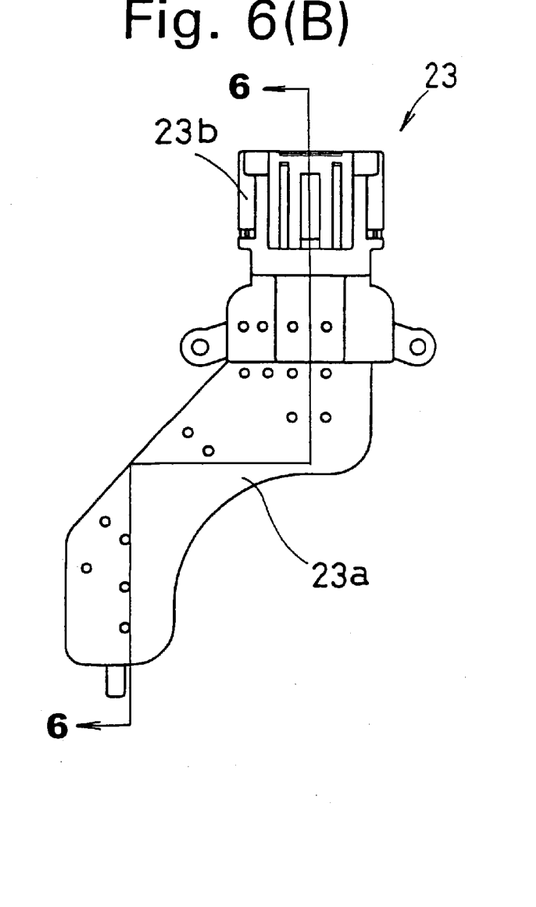
FIG. 6(B) is a backside view.
Figure 6C:
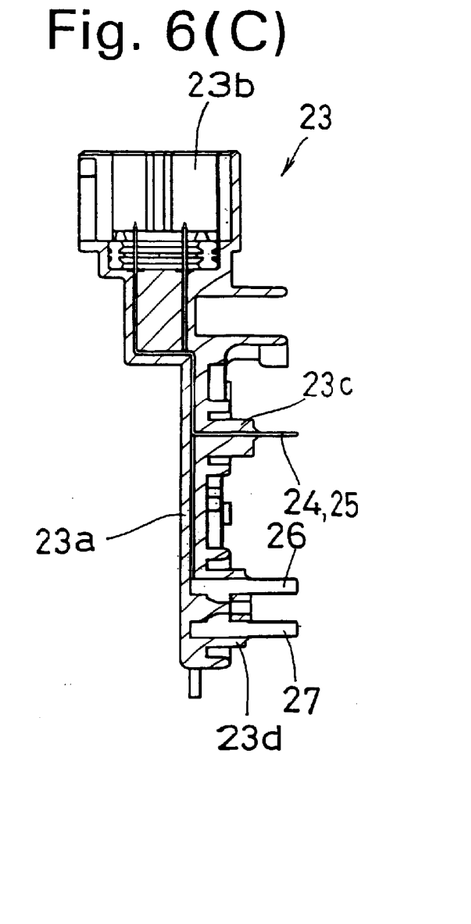
FIG. 6(C) is a cross-sectional view taken along the line 6—6 in FIG. 6(B)
Figure 7:
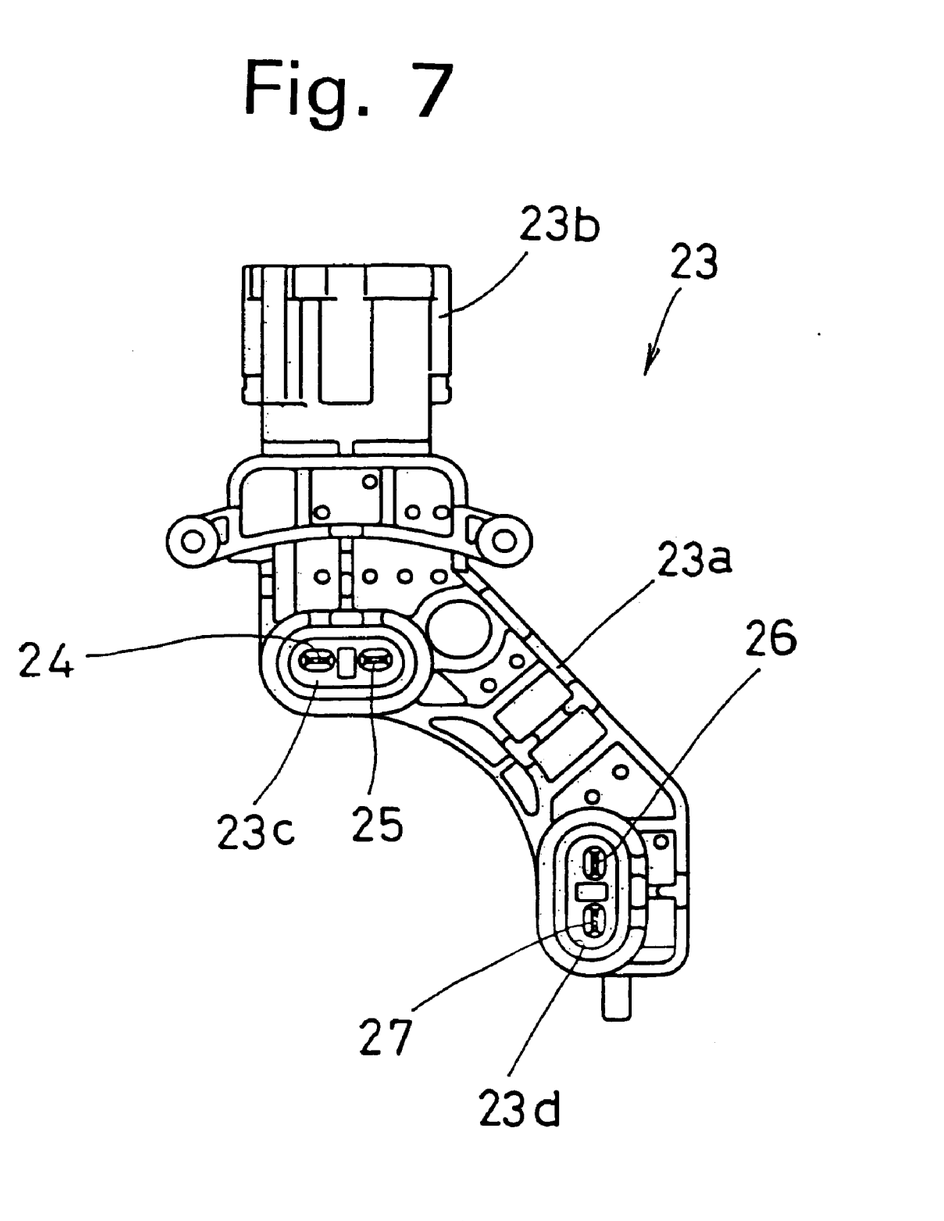
FIG. 7 is a front elevational view of the direct coupler.

First and second through-holes 4c, 4d are positioned at the portion opposing the first and second window holes 9e, 9f that are formed on the holder stay 9. The through-holes 4c, 4d are provided in the end cover 4, whereby even if one end portion 2a of the yoke 2 is covered with the end cover 4, the first connection receiving portion A composed of the tip end portions 21a, 19a of the third and first conductor plates 21, 19 and the second connection receiving portion B composed of the tip end portions 22a, 20a of the fourth and second conductor plates 22, 20 can be seen from the outside.

Further, the tip end portions 19a, 20a, 21a, 22a of the respective conductive plates are made into a pair of ring-shaped portions of which the ring holes are opposed to each other in the circumferential direction and a fitting-in portion for a terminal piece or a lead wire is made between the pair of ring-shaped portions. As described later, when the terminal piece or the lead wire, operating as an external connection member, is inserted from the axial direction, the same is connected between the ring-shaped portions so as to resiliently deform the ring-shaped portions. With this structure, the terminal piece and lead wire are connected movably in the axial direction and the contacting area between the ring-shaped portions and the terminal piece or the lead wire are increased. Therefore, the tip end portions 19a, 20a, 21a, 22a of the respective conductor plates 19, 20, 21, 22 can be connected to either of the terminal piece or the lead wire, wherein the connection can be maintained.

An external power source provided with a universal coupler (not illustrated) is connected to the motor portion 1 thus structured, an external connection member which is either a direct coupler, in which a coupler receiving portion corresponding to the above-described universal coupler is formed, or a lead wire is connected to the first and second connection receiving portions A and B. Such a type is structured so that an external connection member, which is either one of the direct coupler and the lead wire, can be directly connected to the same motor portion 1, wherein the motor portion 1 can be commonly used.

That is, the direct coupler 23 operating as an external connection member comprises a body portion 23a that is formed so as to be along the outside face of the end cover 4 and a coupler portion 23b that is formed so as to protrude toward the outer diameter side of the body portion 23a can be connected to the universal coupler from an external power source.

The first and second protrusion portions 23c, 23d that are inserted into the first and second through-holes 4c, 4d of the end cover 4 opposing the first and second connection receiving portions A, B and are opposed to the outside face 9c of the holder stay 9 in proximity to the outside face 9c, are integrally formed on the inside face of the body portion 23a. One end portion of four terminal pieces 24, 25, 26, 27 that connect the tip end portions 21a, 19a of the third and first conductor plates 21, 19 and the tip end portions 22a, 20a of the fourth and second conductor plates 22, 20 at the corresponding connection receiving portions A, B are disposed at the respective protrusion portions 23c, 23d in a protruding state.

The direct coupler 23 is connected to the first and second connection receiving portions A, B (refer to solid lines in FIGS. 3 and 5) in the following step; namely, with the direct coupler 23 being inserted from the direction of the rotor shaft 7a with respect to the end cover 4, the protrusion portions 23c, 23d are fitted into the first and second through-holes 4c, 4d; then the protruding tip end portions of the respective terminal pieces 24, 25, 26, 27 are inserted between and press-fitted to a pair of ring-shaped portions which are the tip end portions (fitting portions) 19a, 20a, 21a, 22a of the respective conductor plates 19, 20, 21, 22. The respective terminal pieces 24, 25, 26, 27 are disposed so that the other end portions are bent so as to be exposed from the coupler portion 23b side to the outside.

Figure 8:
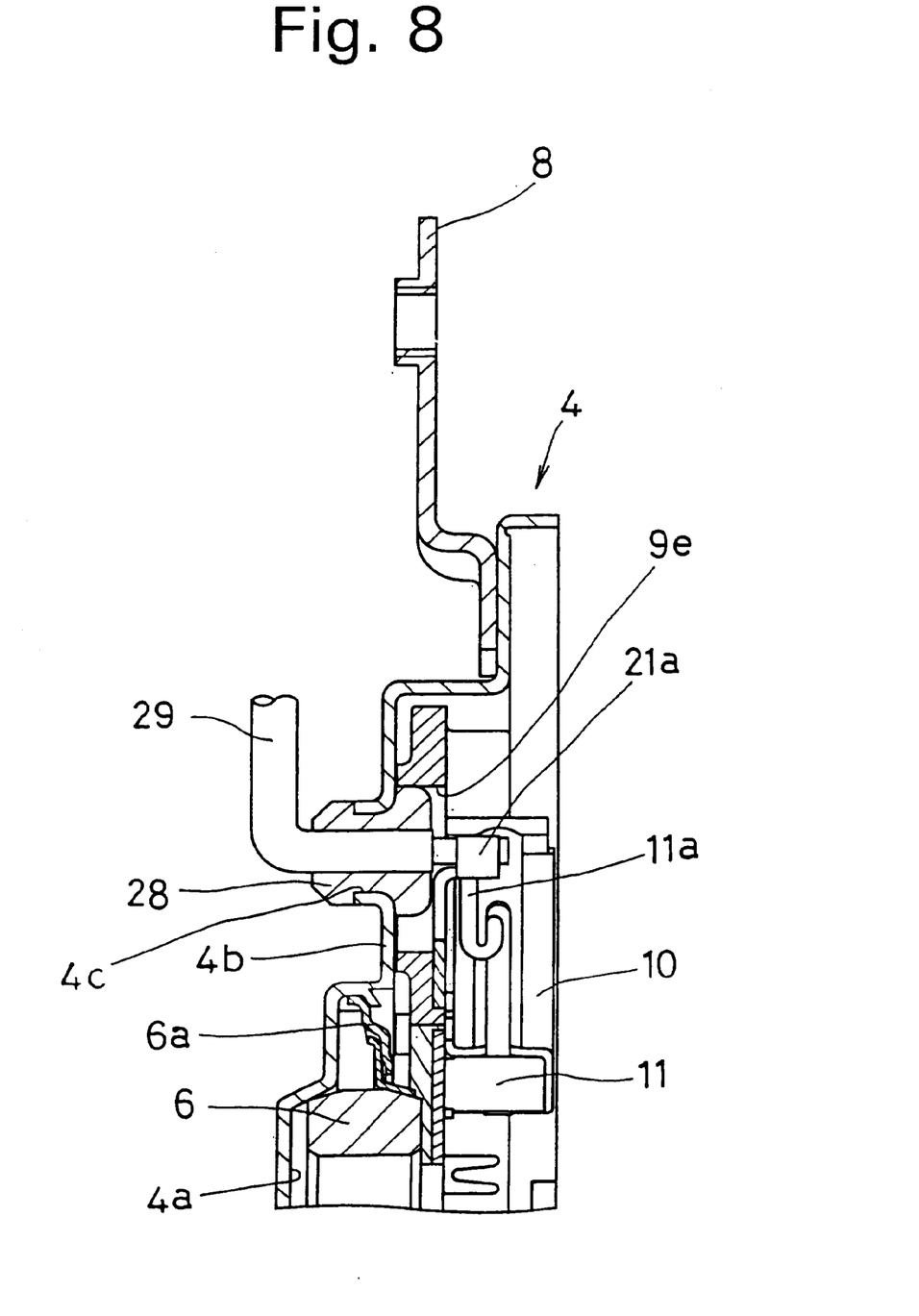
FIG. 8 is a backside view of the end cover portion in which a lead wire is connected to a motor portion whose orientation differs.

To the contrary, where a lead wire is connected to the first and second connection receiving portions A, B, grommets 28 are inserted into the first and second through-holes 4c, 4d of the end cover 4 and, as shown by dash double dot lines in FIG. 5 and as shown in FIG. 8, one end portion of a pair of the respective lead wires 29 are, respectively, inserted into the inside of the end cover 4 through the respective grommets 28, and the respective tip end portions of the respective lead wires 29 are press-fit between a pair of ring-shaped portions that are the tip end portions (fitting portions) 19a, 20a, 21a, 22a of the respective conductive plates, which become the first and second connection receiving portions A, B, whereby connections between the lead wire 29 and the first and second connection receiving portions A, B are brought about.

In the embodiment of the invention, which is structured as described above, a fan motor will operate by rotation of the armature 7 on the basis of a power supply from an external power source. In this case, the first and second connection receiving portions A, B for power supply, are positioned at the body portion 4a of the end cover 4, and are disposed so as to be visible from the outside. These first and second connection receiving portions A, B are formed by using spacing between the positive pole first brush 11 and the negative pole first brush 12 adjacent to each other in the circumferential direction, and between the negative pole first brush 12 and the positive pole second brush 13. Therefore, there is no shortcoming for which products will be made large-sized.

In addition, the first and second connection receiving portions A, B are made into fitting portions composed of a pair of ring-shaped portions in which the tip end portions 19a, 20a, 21a, 22a of the respective conductive plates are resiliently deformable, so that the same receiving portions A, B will be able to be connected to the tip end portions of the terminal pieces 24, 25, 26, 27 of the direct coupler 23 that is inserted from the axial direction, and the tip end portions of the lead wire 29. As a result, two types of fan motors, one of which has a direct coupler, and the other of which uses a lead wire, can be provided by forming a motor portion 1 for a single specification, wherein the holder stay 9, end cover 4 and components around the brushes can be commonly used. Product management can be facilitated, and production costs can be decreased.

Figure 9A:
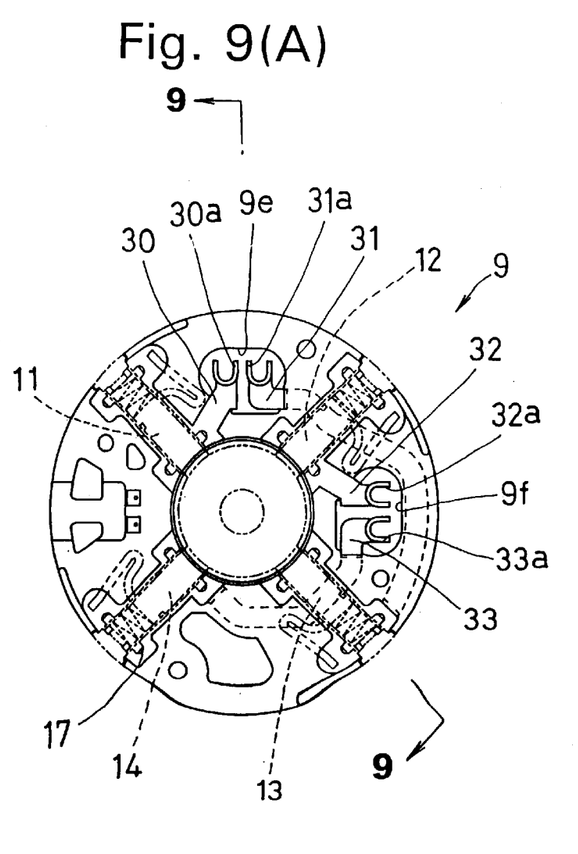
FIG. 9(A) is a front elevational view.
Figures 9B, 9C:
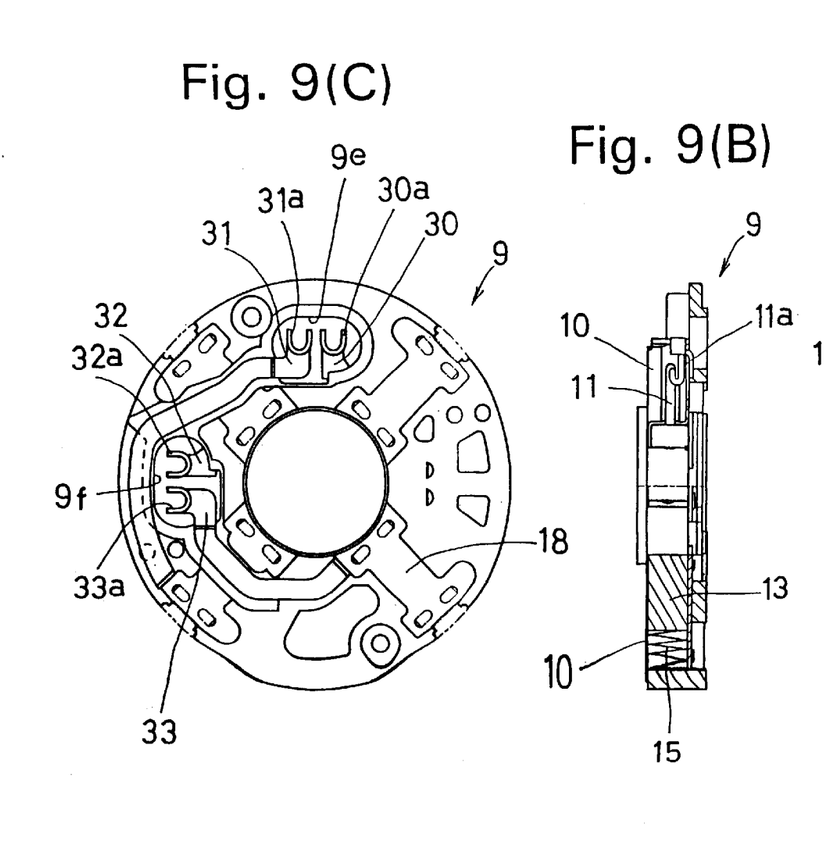
FIG. 9(B) is a cross-sectional view taken along the line 9—9 in FIG. 9(A)
FIG. 9(C) is a backside view.

The invention is not limited to the above-described embodiment. The fitting portion that becomes a visual check portion of the respective conductive plates may be formed, as shown in the second embodiment shown in FIG. 9, to be U-shaped having a recessed portion formed into which the fitting portions 30a, 31a, 32a, 33a of the respective conductive plates 30, 31, 32, 33 can be inserted in the axial direction. That is, any shape may be acceptable, if the shape is such that a terminal piece or a lead wire inserted in the axial direction can be inserted and press-fitted in a state where it can be movable and adjustable in the axial direction and the contacting area thereof can be increased.

Figure 10:
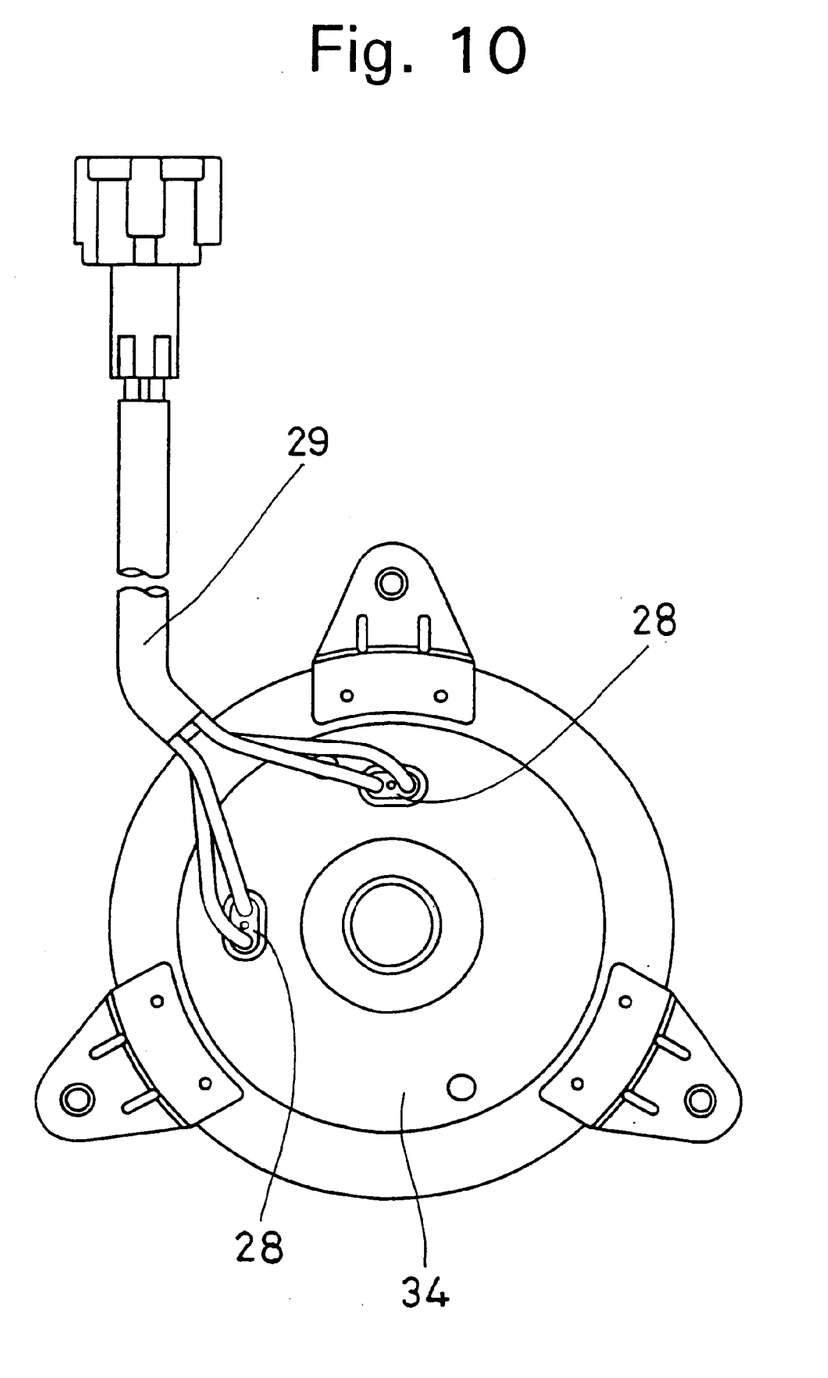
FIG. 10 is a backside view of a motor portion according to the third embodiment.

Further, it is possible to prepare a fan motor, which is formed to be symmetrical at the left and right sides with only the orientation differing. The third embodiment shown in FIG. 10 is such that the lead wire 29 is attached to the end cover 34 formed in the specification opposed to the above-described embodiment. In this type, it is possible to attach a direct coupler to the motor portion formed as in the above-described embodiment, instead of the lead wire.

What is claimed is:

1. An external connection structure of an electric motor structured so as to be provided with a holder stay, which holds four brushes slidably in contact with a commutator of an armature shaft, at an end cover that covers one end of a cylindrical yoke, wherein when providing connection receiving portions that are made conductive to said brushes and are connected to an external connection member to secure an external power source, said connection receiving portions are located on both sides with respect to one brush in the circumferential direction, and are composed of a pair of conductor plates that can be visually observed respectively via first and second through-holes opened in the end cover, and the visually observable portion of the pair of conductor plates has a fitting portion, into which an external connection member to be inserted through the through-hole in the axial direction is fitted, formed thereon, the pair of conductor plates, which can be visually seen from one through-hole, connecting to one brush and another brush which skip a brush adjacent to the one brush so as to become homopolar.

2. The external connection structure of an electric motor as set forth in claim 1, wherein said fitting portion has a ring hole, which is oriented in the axial direction, formed thereon, and the circumferential portions thereof are formed of a pair of ring-shaped portions that are resiliently deformed so as to be brought into contact with each other and to be separated from each other.

3. The external connection structure of an electric motor as set forth in claim 1, wherein said fitting portion is formed to be U-shaped, in which a recess portion that can be inserted in the axial direction is formed.

4. The external connection structure of an electric motor as set forth in claim 1, wherein an external lead-out coupler is connected to and incorporated in said connection receiving portion, a projection portion that is inserted into the through-hole is formed on said lead-out coupler, and a projection end portion of a terminal built in said projection portion is connected to said fitting portion.

5. The external connection structure of an electric motor as set forth in claim 2, wherein an external lead-out coupler is connected to and incorporated in said connection receiving portion, a projection portion that is inserted into the through-hole is formed on said lead-out coupler, and a projection end portion of a terminal built in said projection portion is connected to said fitting portion.

6. The external connection structure of an electric motor as set forth in claim 3, wherein an external lead-out coupler is connected to and incorporated in said connection receiving portion, a projection portion that is inserted into the through-hole is formed on said lead-out coupler, and a projection end portion of a terminal built in said projection portion is connected to said fitting portion.

7. The external connection structure of an electric motor as set forth in claim 1, wherein lead wires are connected to said connection receiving portion, said lead wires are inserted into the through-hole via a grommet inserted in the through-hole, and said insertion tip end portion is press-fitted to the fitting portion.

8. The external connection structure of an electric motor as set forth in claim 2, wherein lead wires are connected to said connection receiving portion, said lead wires are inserted into the through-hole via a grommet inserted in the through-hole, and said insertion tip end portion is press-fitted to the fitting portion.

9. The external connection structure of an electric motor as set forth in claim 3, wherein lead wires are connected to said connection receiving portion, said lead wires are inserted into the through-hole via a grommet inserted in the through-hole, and said insertion tip end portion is press-fitted to the fitting portion.

* * * * *